(12) United States Patent  (10) Patent No.: US 8,919,640 B2
Vellozo Luz et al.  (45) Date of Patent: Dec. 30, 2014

(54) METHODS AND SYSTEMS FOR REGISTERING RELATIONSHIPS BETWEEN USERS VIA A SYMBOLOGY

(75) Inventors: Andre Gustavo Vellozo Luz, Sao-Paulo (BR); Mauricio Ghetler, São Paulo (BR)

(73) Assignee: Paychief LLC, New York, NY (US)

( * ) Notice: Subject to any disclaimer, the term of this patent is extended or adjusted under 35 U.S.C. 154(b) by 271 days.

(21) Appl. No.: 13/531,050

(22) Filed: Jun. 22, 2012

(65) Prior Publication Data

US 2013/0341390 A1  Dec. 26, 2013

(51) Int. Cl.
*G06F 17/00*  (2006.01)

(52) U.S. Cl.
USPC .................. 235/375; 235/462.44; 235/472.01

(58) Field of Classification Search
USPC .......... 235/375, 380, 462.44, 462.45, 462.46, 235/472.01, 472.02, 472.03; 709/217; 715/738
See application file for complete search history.

(56) References Cited

U.S. PATENT DOCUMENTS

| | | | |
|---|---|---|---|
| 5,317,135 A | 5/1994 | Finocchio | |
| 6,993,507 B2 | 1/2006 | Meyer et al. | |
| 7,207,481 B2 | 4/2007 | Barenburg et al. | |
| 7,427,017 B2 | 9/2008 | Morrison et al. | |
| 7,909,243 B2 | 3/2011 | Merkow et al. | |
| 8,002,175 B2 | 8/2011 | Kuriyama et al. | |
| 2002/0010800 A1 | 1/2002 | Riley et al. | |
| 2002/0111884 A1 | 8/2002 | Groat et al. | |
| 2003/0134648 A1 | 7/2003 | Reed et al. | |
| 2004/0039937 A1 | 2/2004 | Aissi et al. | |
| 2008/0313081 A1 | 12/2008 | Wee | |
| 2010/0017860 A1 | 1/2010 | Ishida | |
| 2010/0138344 A1 | 6/2010 | Wong et al. | |
| 2011/0029769 A1 | 2/2011 | Aissi et al. | |
| 2011/0246291 A1 | 10/2011 | Paul | |
| 2011/0251892 A1 | 10/2011 | Laracey | |
| 2011/0264586 A1 | 10/2011 | Boone et al. | |
| 2011/0270751 A1 | 11/2011 | Csinger et al. | |
| 2011/0282965 A1* | 11/2011 | Dodson ......................... | 709/217 |
| 2011/0283196 A1* | 11/2011 | Berger et al. ................. | 715/738 |
| 2012/0203696 A1 | 8/2012 | Morgan et al. | |
| 2012/0203701 A1 | 8/2012 | Ayuso de Paul | |
| 2013/0061337 A1 | 3/2013 | Zimberoff et al. | |
| 2013/0069794 A1 | 3/2013 | Terwilliger et al. | |
| 2013/0124412 A1 | 5/2013 | Itwaru | |
| 2013/0167213 A1 | 6/2013 | Sandhu et al. | |
| 2014/0090035 A1 | 3/2014 | Kodama | |

* cited by examiner

*Primary Examiner* — Karl D Frech
(74) *Attorney, Agent, or Firm* — Pepper Hamilton LLP

(57) ABSTRACT

Methods and systems for registering a relationship between users are disclosed. A first electronic device transmits a request to provide relationship information to a computing device. The computing device generates a transaction code and transmits the code to the first electronic device. The first electronic device generates a symbology corresponding to the code and displays the symbology. A second electronic device scans the symbology and decodes the symbology to obtain the transaction code. The second electronic device transmits the code to the computing device, which associates relationship information for the users of the first and second electronic devices. The first electronic device receives the relationship information for the user of the second electronic device from the computing device, and the second electronic device receives the relationship information for the user of the first electronic device.

21 Claims, 7 Drawing Sheets

METHODS AND SYSTEMS FOR REGISTERING RELATIONSHIPS BETWEEN USERS VIA A SYMBOLOGY

BACKGROUND

Recently, the use of mobile devices, such as smartphones and the like, has rapidly increased. This increase has resulted in part from the porting of technologies to mobile electronic devices that were once limited to non-mobile applications. Mobile technologies provide the promise of a more efficient use of time by allowing interactions with other people and institutions at any time and place.

One way in which people interact in both professional and personal settings is providing contact information to other people. Currently, this is accomplished in a professional environment by providing a business card to a receiving individual and having the information entered into a contact list at a later time. In a social setting, information can alternately be provided by giving out a telephone number, a name and address or the like to another person.

SUMMARY

In an embodiment, a method of registering a relationship between users may include receiving, by a first electronic device, a request for providing relationship information for a first user of the first electronic device, transmitting, by the first electronic device, the request to a computing device, receiving, by the first electronic device, data corresponding to the request from the computing device, creating, by the first electronic device, a symbology encoding the data therein, and displaying, by the first electronic device, the symbology.

In an embodiment, a method of registering a relationship between users may include scanning, by a first electronic device, a symbology displayed on a second electronic device associated with a user, where the symbology encodes data comprising a transaction code and is associated with a relationship request, decoding, by the first electronic device, the data from the symbology, transmitting, by the first electronic device, the data to a computing device, and receiving, by the first electronic device, relationship information for the user of the second electronic device from the computing device.

In an embodiment, a method of registering a relationship between users may include receiving, by a computing device, a request to provide relationship information from a first electronic device associated with a first user having associated first relationship information stored in a database in operable communication with the computing device, creating, by the computing device, data corresponding to the request, transmitting, by the computing device, the data to the first electronic device, receiving, by the computing device, the data from a second electronic device associated with a second user having associated second relationship information stored in the database, transmitting, by the computing device, the first relationship information to the second electronic device, and transmitting, by the computing device, the second relationship information to the first electronic device.

In an embodiment, a system for registering a relationship between users may include a computing device, a database in operable communication with the computing device, and a non-transitory processor-readable storage medium in operable communication with the computing device. The processor-readable storage medium contains one or more programming instructions that, when executed, cause the computing device to receive a request for providing relationship information from a first electronic device associated with a first user having associated first relationship information stored in the database, create data corresponding to the request, transmit the data to the first electronic device, receive the data from a second electronic device associated with a second user having associated second relationship information stored in the database, receive the first and second relationship information from the database, transmit the first relationship information to the second electronic device, and transmit the second relationship information to the first electronic device.

DETAILED DESCRIPTION

Figure 1:
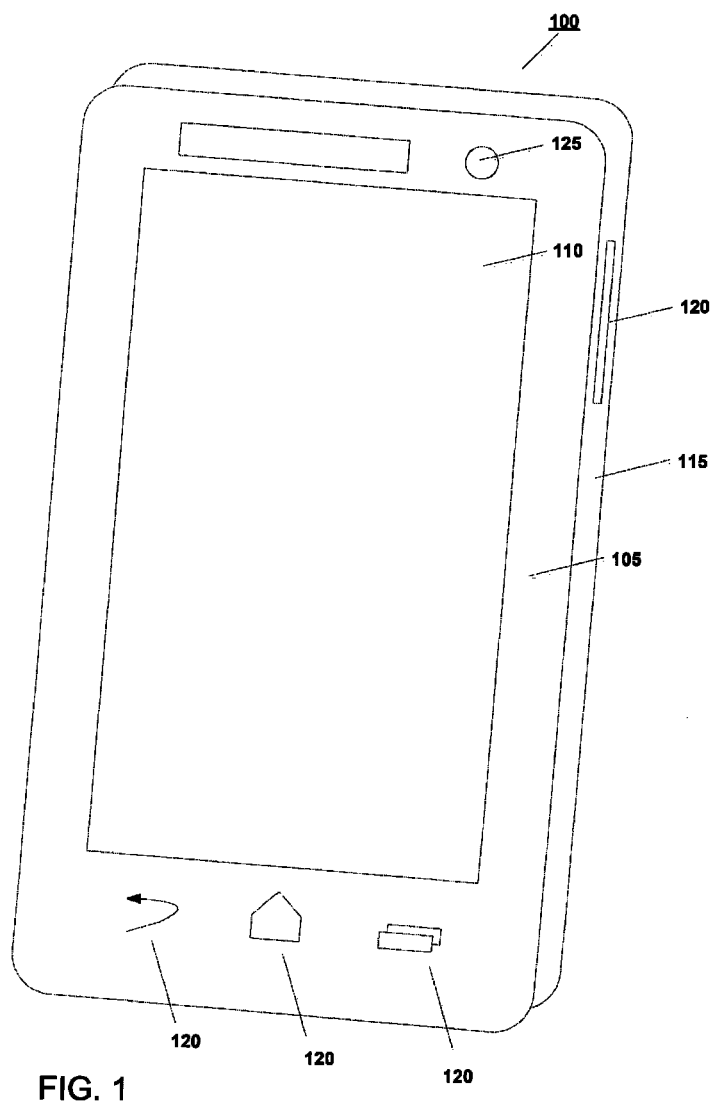
FIG. 1 depicts a perspective view of a first and second face of a mobile device according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

An "electronic device" refers to a device that includes a processing device and tangible, computer-readable memory. The memory may contain programming instructions that, when executed by the processing device, cause the device to perform one or more operations according to the programming instructions. Examples of electronic devices include personal computers, gaming systems, televisions and mobile devices.

A "mobile device" refers to an electronic device that is generally portable in size and nature. Accordingly, a user may transport a mobile device with relative ease. Examples of mobile devices include pagers, cellular phones, feature phones, smartphones, personal digital assistants (PDAs), cameras, tablet computers, phone-tablet hybrid devices, laptop computers, netbooks, ultrabooks, global positioning satellite (GPS) navigation devices, in-dash automotive components, media players, watches and the like.

A "computing device" is an electronic device, such as, for example, a computer, a server or components thereof. The computing device can be maintained by entities such as financial institutions, corporations, governments, and/or the like. The computing device may generally contain a memory or other storage device for housing programming instructions, data or information regarding a plurality of users, such as, for example, contact information, personal information, account information, account balances, account numbers and service login information. The computing device may also have data regarding product inventories, billing information, purchase order information, contracts, bills of sale, and/or the like. The data may optionally be contained on a database, which is stored in the memory or other storage device. The data may optionally be secured by any method now known or later developed for securing data. The computing device may further be in operable communication with one or more electronic devices, such as, for example, the mobile devices described herein. The communication between the computing device and each of the mobile devices may further be secured by any method now known or later developed for securing transmissions or other forms of communication. The computing device may further contain a registry of "authorized users" wherein the authorized users are users that have registered to use the systems and methods described herein. Users may obtain "authorized user" status by, for example, providing contact information, account information, and/or the like.

A "symbology" is a pattern, a symbol, an image or the like, as well as portions and combinations thereof, that is displayed on a substrate, such as, for example, the display depicted in FIG. 1. The symbology provides an optical, electronically-readable encoded representation of data. Symbologies can include, without limitation, one-dimensional barcodes, two-dimensional (2D) barcodes or three-dimensional barcodes. Examples of two-dimensional barcodes include data matrix codes, quick response codes, Aztec codes, Maxi codes and the like. Symbologies can also include letters, numbers, punctuation and other symbols. The symbology may be displayed on a display and may be of any geometric shape or size. In this document, the terms "barcode" or "matrix code" may be used in the examples, but the term is intended to include any type of symbology.

Figure 6:
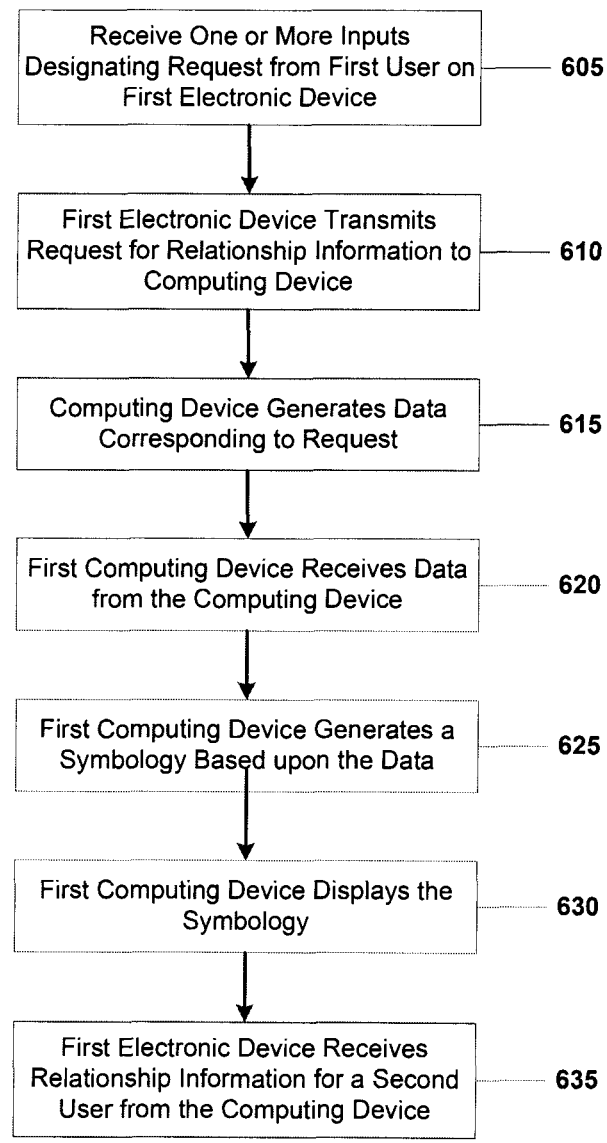
FIG. 6 depicts a flow diagram of an illustrative process for creating and displaying a symbology used to form a relationship between users according to an embodiment.
Figure 7:
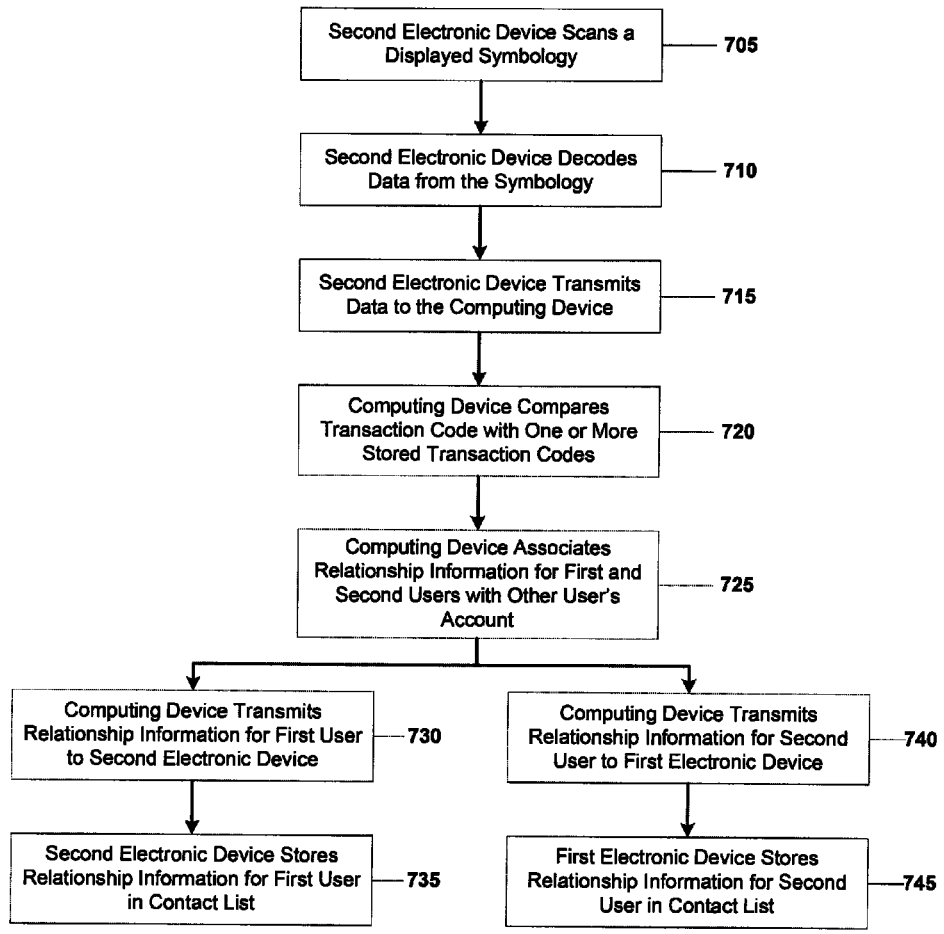
FIG. 7 depicts a flow diagram of an illustrative process for scanning a symbology and forming a relationship between users according to an embodiment.

An "application environment" is an embodiment of programming instructions that direct the various components of each electronic device to execute a plurality of steps, such as those described in more detail in FIGS. 6 and 7. The application environment, when contained in a mobile device, may be referred to as a "mobile application environment." Similarly, the application environment, when contained in a computing device, may be referred to as a "computing application environment." The mobile application environment may be a software application or the like, such as a smartphone "app." The mobile application environment may generally provide a means for reading, decoding, encoding and communicating the data encoded by a symbology. The computing application environment may generally provide a means for communicating with each mobile device, a means for reading, translating and transmitting data, and a means for completing other tasks, as described in greater detail herein.

FIG. 1 depicts a perspective view of a mobile device, generally designated 100, according to an embodiment. The mobile device may have a first face 105 and a second face 115. The first face 105 may have a display 110. The display 110 may generally be a component for displaying images, text, video and the like. Examples of displays may include, but are not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays.

The mobile device 100 may be configured to generate a symbology and/or display the generated symbology on the display 110, as described in more detail herein. The mobile device 100 may generate the symbology by using any methods now known or later developed for creating and encoding symbologies. Alternatively, the mobile device 100 may receive the symbology from another mobile device and/or a computing device.

The mobile device 100 may further have one or more user interface components 120, which may be positioned on any face of the device, including, but not limited to, the first face 105 and the second face 115. The one or more user interface components 120 may generally be configured to elicit one or more commands to the mobile device 100 when actuated. Examples of user interface components 120 may include keypads, switches, buttons and/or the like.

As an alternative to, or in conjunction with the one or more user interface components 120, the display 110 may further include a touch sensitive screen, wherein the touch sensitive screen may act as a user interface component. The touch sensitive screen may receive contact based inputs from a user, such as from a user's fingers. The touch sensitive screen may be adapted for gesture control, thus allowing for a user to tap, pinch, swipe or provide other similar gestures to elicit commands to the mobile device 100. The touch sensitive screen may further be capable of sending touch commands to the processing device. Examples of touch sensitive screens may include, but are not limited to, resistive touchscreens, capacitive touchscreens, infrared touchscreens and/or other technologies now known or later developed. The mobile device 100 may also be adapted to receive commands via body gestures, voice, audio signals, device movement and/or the like.

Figure 2:
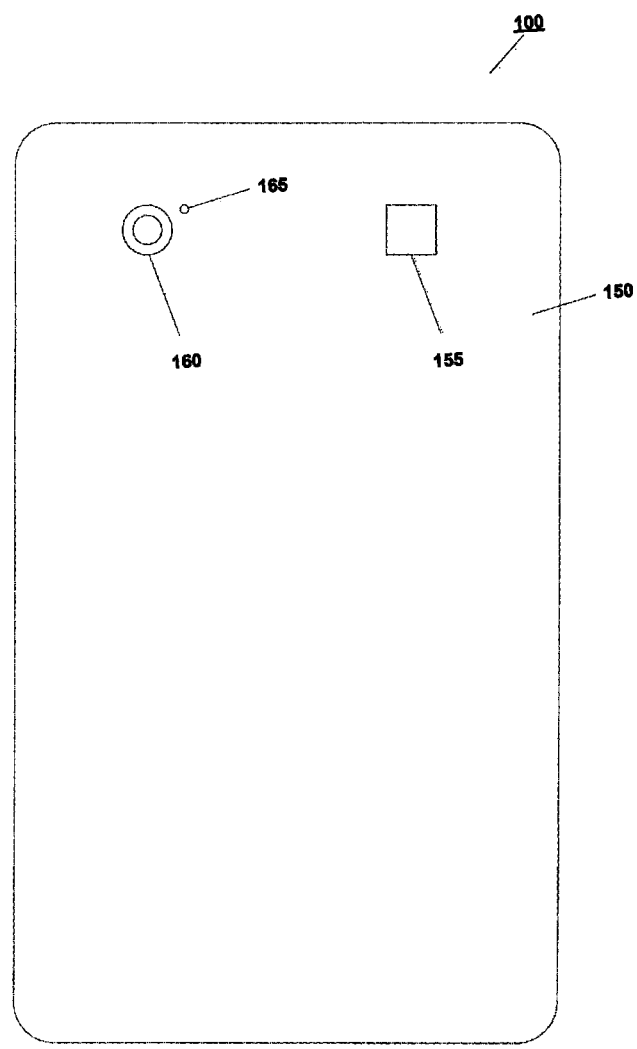
FIG. 2 depicts a perspective view of a third face of the mobile device in FIG. 1 according to an embodiment.

FIG. 2 depicts a perspective view of a third face 150 of the mobile device 100, according to an embodiment. The third face 150 may generally have an optical component 160. The third face 150 may also optionally have an audio component 155 and/or an illumination component 165.

The optical component 160 may be any suitable component capable of receiving an optical image and transmitting image information to other components of the mobile device 100 for processing, such as, for example, a camera. The optical component 160 may further have an ability to adjust its focal length and aperture in such a manner that would allow it to zoom and properly focus upon an intended object to be imaged. Such ability may be through mechanical components (such as an optical zoom) or programming (such as a digital zoom). This adjustment may define an "optimal focal distance," or a range of distances in which the mobile device 100 may be properly positioned from the intended object to be imaged to achieve a clear image.

While the optical component 160 is depicted on the rear face of the present example, persons skilled in the art will appreciate that the optical component 160 may be positioned at any location on or in any face of the mobile device 100, or may even be external to the mobile device 100 and connected by any means of communication, including, but not limited to, physical cable communication such as universal serial bus (USB), wireless radio communication, wireless light communication, or near field communication technology.

The optical component 160 may further be configured to receive an optical image on the display of another mobile device, such as, for example, a symbology displayed on the display of the other mobile device, as described in greater detail herein.

The optional illumination component 165 may be utilized in any light conditions to assist the optical component 160 in completing any of the tasks described herein. Additionally, the illumination component 165 may be independently activated to turn on or off at specific points in time, such as when additional lighting is necessary to capture an ideal image. Other features of the illumination component 165 may include dimming, strobe, constant on and/or the like.

The illumination component 165 may contain any suitable light source capable of providing illumination, including, but not limited to, magnesium-based flashes, xenon-based flashes, fulminate-containing flashes, light-emitting diode (LED) flashes and the like. While the present figure depicts the illumination component 165 as being integrated with the mobile device 100, it may be appreciated that the illumination component 165 may be a separate component in communication with the mobile device 100, such as USB based flashes, hot shoe based flashes, remote slave flash units, or other similar devices.

The optional audio component 155 may be adapted to emit audio tones and signals. Such audio tones and signals may be used to instruct the user to complete various steps as described herein, and may further indicate to the user that an image has been received by the optical component 160 by emitting a beep, click or other audio signal. Additionally, the audio component 155 may be adapted to receive audio signals. Such audio signals may include, for example, voice commands from a user.

Figure 4:
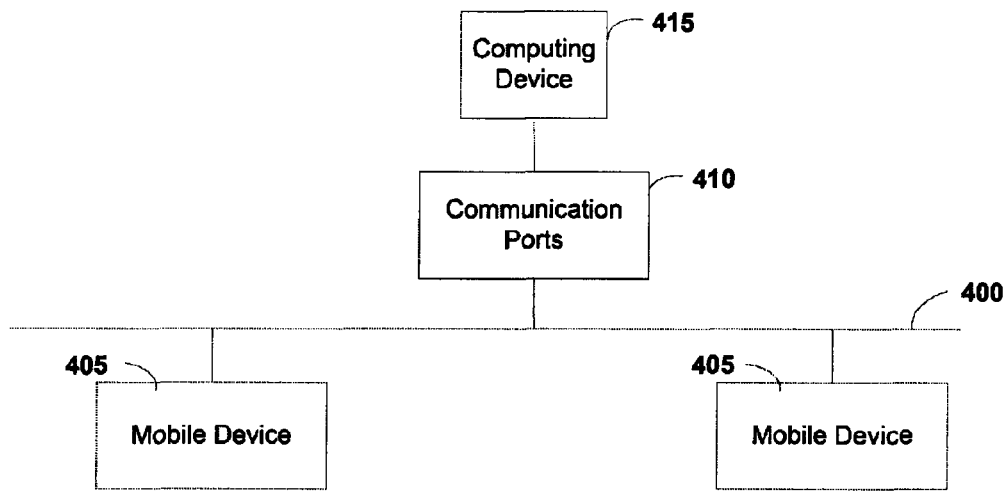
FIG. 4 depicts a block diagram of an illustrative communications system between mobile devices and a computing device according to an embodiment.

The mobile device 100 may further have an ability to connect to a communications network, as described in FIG. 4 herein. The types of communications networks that may be used in accordance with this disclosure are not limited in any manner, and may include any communications network now known or later developed. For example a communications networks may include, but is not limited to, the Internet, an intranet, a wide area network (WAN), a local area networks (LAN), a wireless local area networks (WLAN), a storage area networks (SAN) and/or the like.

The configuration of the mobile device 100 as shown in FIGS. 1 and 2 is merely an example of a mobile device, and persons skilled in the art will appreciate that other configurations and embodiments will be possible without departing from the scope of this disclosure.

Figure 3:
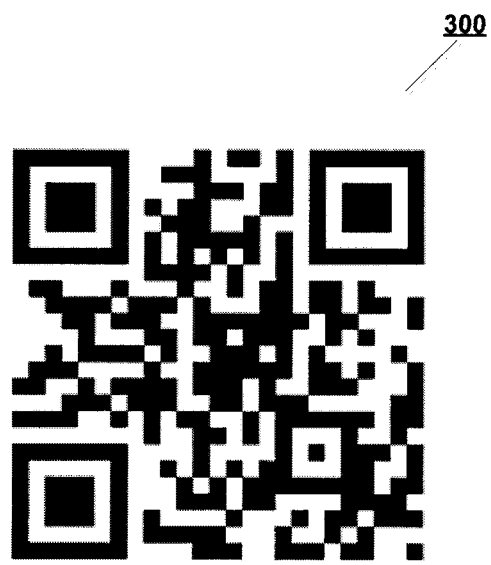
FIG. 3 depicts a symbology according to an embodiment.

FIG. 3 depicts an example of a symbology, generally designated 300, that may be used in accordance with an embodiment. The symbology 300 may be displayed, for example, on the display 110 of the mobile device 100 (FIG. 1) or affixed to a substrate.

The symbology 300 may be generated by a mobile device 100, or may be generated by any other electronic device, such as for example, a computing device. In instances where the symbology 300 is generated by anything other than the mobile device 100, it may be transmitted to the mobile device 100 for further use, such as for display upon the display 110 (FIG. 1), addition to other documents and/or elements, or for scanning, reading or decoding.

The symbology 300 may be encoded with data that may generally be used by a computing device to gain access to secured information. Examples of secured information may include, but are not limited to, information regarding a user's banking account, an amount of money to be sent and/or received, a date and time of transmission of money for future payments, and/or the like. The symbology 300 may further be encoded with other data, such as, for example, information regarding a product or a service, information regarding a payee, purchase payment information, information about a bill and purchase order information.

The information encoded in the symbology 300 may further be encrypted. In instances where the information encoded in the symbology 300 is encrypted, the symbology 300 may only be read by certain symbology reading devices and/or applications, such as those that contain or maintain access to an encryption key or another similar means for decrypting the information encoded in the symbology 300. Encryption may be completed by any encryption method now known or later developed. Examples of encryption may include, but are not limited to, manual encryption, transparent encryption, symmetric encryption, asymmetric encryption and the like.

As an alternative to being encrypted, the symbology 300 may be readable by any symbology reading device and/or application. However, the information encoded within the symbology 300 may appear to a user of the symbology reading device and/or application as a random placement of characters, numbers, symbols and the like. However, if the symbology 300 is read using the application environment, the application environment may recognize the characters, numbers, symbols and the like and may perform or complete tasks accordingly, as described in more detail herein.

The symbology 300 may be a standalone image, or may be incorporated within another object, such as, for example, an additional image, text, icons and/or the like. In instances where the symbology 300 is incorporated within another object, the other object may provide at least a portion of the information encoded by the symbology 300.

FIG. 4 depicts a block diagram of communications between one or more electronic devices and one or more computing devices. A communications network 400 may serve as an information highway interconnecting the other illustrated components. The communications network is not limited by this disclosure, and may include any communications network now known or later developed. Examples of communications networks may include, but are not limited to, the Internet, intranets, wired networks and wireless networks. One or more electronic devices 405, such as mobile devices, computing devices and the like may connect to the communications network 400. In embodiments where a plurality of electronic devices 405 are connected to the communications network 400, each electronic device 405 may be configured to communicate with other electronic devices via the communications network 400. A computing device 415 may also be connected to the communications network 400, and may optionally connect through the use of one or more communications ports 410.

Figure 5:
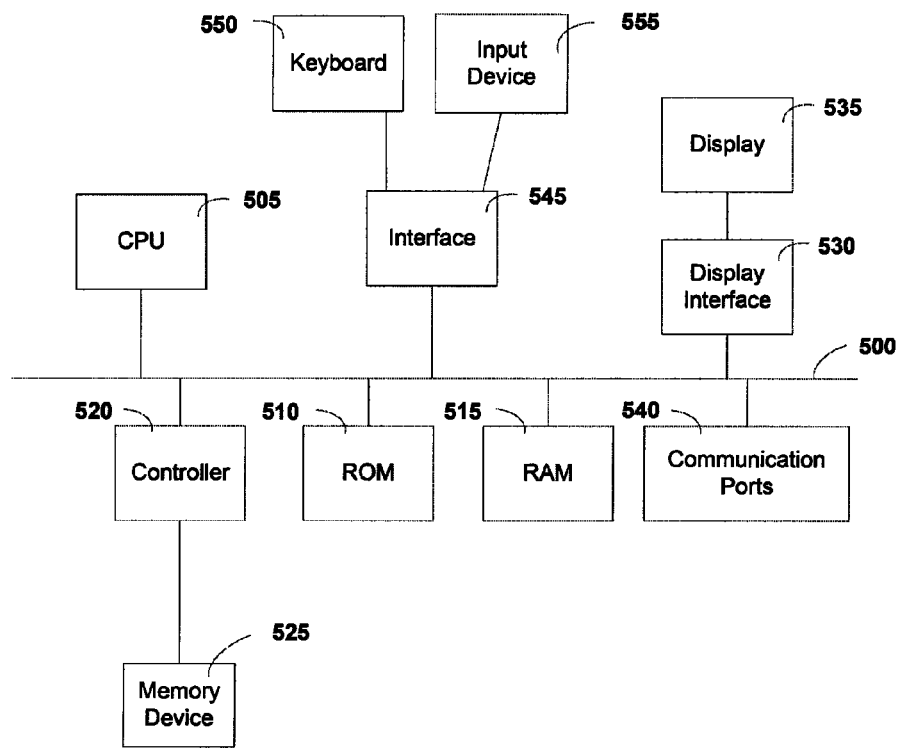
FIG. 5 depicts a block diagram of illustrative internal hardware that may be used to contain or implement program instructions according to an embodiment.

FIG. 5 depicts a block diagram of illustrative internal hardware that may be used to contain or implement program instructions, such as the process steps discussed herein in reference to FIGS. 6 and 7, according to embodiments. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an illustrative processing device, computing device or processor as such terms are used within this disclosure. Read only memory (ROM) 510 and random access memory (RAM) 515 constitute illustrative memory devices (i.e., processor-readable non-transitory storage media).

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-ray™ disc, and/or other non-transitory storage media.

An optional display interface 530 may permit information from the bus 500 to be displayed on the display 535 in audio, visual, graphic or alphanumeric format. Communication with external devices, such as a print device, may occur using various communication ports 540. An illustrative communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

FIG. 6 depicts a flow diagram of an illustrative process for creating and displaying a symbology used to form a relationship between users according to an embodiment. One or more inputs may be received 605 from a user of the first electronic device. The one or more inputs may be in the form of a physical interaction with the electronic device containing the application environment, such as touching any number of user interface components, a touch screen and/or the like, as described herein. Alternatively or additionally, the one or more inputs may be in the form of audio commands, gestures, physical movement of the first electronic device and/or the like. The one or more inputs may generally provide information to the application environment regarding the type of operation to perform, such as a request to transfer relationship information. Additional and/or alternate information may also be provided within the scope of this disclosure.

The application environment on the first electronic device may transmit 610 the request for the relationship information from the one or more inputs to a computing device. The computing device may generate 615 data that corresponds to the request. The data may be, for example, a unique transaction code that allows the computing device to match the symbology and/or the transaction code to the request. In an embodiment, the transaction code may be associated with relationship information stored in a user account associated with the first electronic device or the user of the first electronic device.

The database may be located in the computing device and may only be accessible via the computing device through the use of secure means of communication, such as encrypted communication. Alternatively or additionally, the database may be in a non-transitory memory in operable communication with the computing device or in a remote computing device and may only be accessible via the computing device through the use of secure means of communication. A portion of the information stored in the database may be secured and only accessible by the computing device, and a portion may be unsecured and accessible by other devices, such as, for example, one or more electronic devices. The secured portion may generally contain sensitive information such as account numbers, sensitive personal information, and the like. The unsecured portion may generally contain non-sensitive information, such as the relationship information permitted to be transmitted according to the teachings of this disclosure. In an embodiment, the relationship information may include one or more of a physical address for the user, a telephone number for the user, a user's name, an email address for the user, a name of a company at which the user is employed or with which the user is associated, a title for the user and/or the like.

The application environment on the first electronic device may receive 620 the data from the computing device and may generate 625 a symbology based upon the data. In an alternate embodiment, the symbology may be generated at the computing device and securely transmitted to the first computing device. Generation of the symbology may also involve encoding data that provides an indicator to the computing device to access particular relationship information.

In an embodiment, the symbology may include one or more of a multi-dimensional bar code and a quick response (QR) code, although other symbologies may also be used within the scope of this disclosure.

The symbology may be displayed 630 on the first electronic device. For example, the symbology may be displayed 630 on a graphical user interface of the first electronic device. Alternately, the symbology may be made available for printing, emailing, or other transmission to another electronic device or a physical medium by the first electronic device.

In an embodiment, the first electronic device may receive 635 relationship information for a second user from the computing device in response to a second electronic device associated with the second user scanning the displayed symbology, as will be discussed further in reference to FIG. 7.

FIG. 7 depicts a flow diagram of an illustrative process for scanning a symbology and forming a relationship between users according to an embodiment. As shown in FIG. 7, a second electronic device may scan 705 the symbology displayed on the first electronic device. This may be accomplished by arranging the second electronic device in such a manner so as to allow the application environment on the second electronic device to scan the symbology. Scanning 705 the symbology may be performed by any method of scanning now known or used in the future. In an alternate embodiment, the second electronic device may scan 705 a symbology from a different medium, such as a physical medium, an electronic display, or the like.

The symbology may encode data, such as a transaction code associated with relationship information. In particular, the data may be associated with a relationship request initiated by the first electronic device or a first user associated with the first electronic device. The second electronic device may likewise be associated with a second user.

The second electronic device may decode 710 the data from the symbology. For example, the application environment on the second electronic device may be used to decode 710 the data from the symbology. In an embodiment, the application environment may verify that the symbology satisfies a required format prior to performing the decoding 710 operation.

The second electronic device may transmit 715 the data to a computing device, such as the computing device discussed above in reference to FIG. 6. In an embodiment, the second electronic device may receive an authorization to transmit 715 the data to the computing device prior to transmitting the data.

The computing device may receive the data and compare 720 the data with one or more transaction codes stored in a database. The transaction codes may each represent a unique identifier that directs the computing device to retrieve relationship information for the first user. More particularly, the transaction code may be used to identify the relationship information associated with first user.

In an embodiment, the computing device may associate 725 the relationship information for the first user with a user account for the second user and the relationship information for the second user with a user account for the first user. The computing device may perform this operation by using the data representing the transaction code to identify the first user and the transmission of the data from the second electronic device to identify the second user. Accordingly, relationship information associated with the first and second users may be associated with the other account as part of, for example, a contact list. Other methods of associating 725 the relationship information for the respective users or establishing a relationship for the users within the computing device will be apparent to those of ordinary skill in the art based on the teachings of this disclosure. In an embodiment, the relationship information of the first user may include one or more of a physical address, a telephone number, a name, and an email address associated with the user of the first electronic device. In an embodiment, the relationship information of the second user may include one or more of a physical address, a telephone number, a name, and an email address associated with the user of the second electronic device.

In an embodiment, the computing device may transmit 730 the relationship information associated with the first user to the second electronic device. The second electronic device may receive the relationship information associated with the first user and store 735 it in a local contact list, synchronize the relationship information associated with the first user, or the like.

In an embodiment, the computing device may transmit 740 the relationship information associated with the second user to the first electronic device. The first electronic device may receive the relationship information associated with the second user and store 745 it in a local contact list, synchronize the relationship information associated with the second user, or the like.

In an embodiment, if either the first user or the second user updates their relationship information with the computing device, the association at the computing device may cause the updated relationship information to be transmitted to the electronic device associated with the other user.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of registering a relationship between users, the method comprising:
   receiving, by a first electronic device, a request to transfer relationship information for a first user of the first electronic device to a second user of a second electronic device, wherein the relationship information comprises information pertaining to one or more of a physical address, a telephone number, a name, and an email address associated with the first user;
   transmitting, by the first electronic device, the request to a computing device;
   receiving, by the first electronic device, data corresponding to the request from the computing device;
   creating, by the first electronic device, a symbology encoding the data therein; and
   displaying, by the first electronic device, the symbology.

2. The method of claim 1, wherein the symbology comprises one or more of a multi-dimensional bar code and a quick response (QR) code.

3. The method of claim 1, wherein the data comprises a unique identifier that allows the computing device to match the symbology to the request.

4. The method of claim 1, wherein displaying the symbology comprises displaying the symbology on a graphical interface of the first electronic device.

5. The method of claim 1, further comprising:
   receiving, by the first electronic device, relationship information for the second user from the computing device in response to the second electronic device associated with the second user scanning the symbology.

6. A method of registering a relationship between users, the method comprising:
   scanning, by a first electronic device, a symbology displayed on a second electronic device, wherein the symbology encodes data therein, wherein the data comprises a transaction code and is associated with a request to transfer relationship information comprising one or more of a physical address, a telephone number, a name, and an email address associated with a user of the second electronic device;
   decoding, by the first electronic device, the data from the symbology;
   transmitting, by the first electronic device, the data to a computing device; and
   receiving, by the first electronic device, the relationship information for the user of the second electronic device from the computing device.

7. The method of claim 6, wherein the data comprises a unique identifier that directs the computing device to retrieve relationship information of the user.

8. The method of claim 6, wherein the request is stored as request data having a secured portion and an unsecured portion in a memory of the computing device.

9. The method of claim 8, wherein the secured portion of the request data is only accessible from the memory by the computing device.

10. The method of claim 6, wherein the symbology comprises one or more of a multi-dimensional bar code and a quick response (QR) code.

11. The method of claim 6, further comprising:
    receiving, by the first electronic device, an authorization to transmit the data to the computing device.

12. A method of registering a relationship between users, the method comprising:
    receiving, by a computing device, a request to transfer relationship information from a first electronic device associated with a first user having associated first relationship information stored in a database in operable communication with the computing device, wherein the first relationship information comprises information pertaining to one or more of a physical address, a telephone number, a name, and an email address associated with the first user;
    creating, by the computing device, data corresponding to the request;
    transmitting, by the computing device, the data to the first electronic device;
    receiving, by the computing device, the data from a second electronic device associated with a second user having associated second relationship information stored in the database, wherein the second relationship information comprises information pertaining to one or more of a physical address, a telephone number, a name, and an email address associated with the second user;

transmitting, by the computing device, the first relationship information to the second electronic device; and transmitting, by the computing device, the second relationship information to the first electronic device.

13. The method of claim 12, further comprising:

associating, by the computing device, the first relationship information with a user account for the second user and the second relationship information with a user account for the first user.

14. The method of claim 12, wherein the data is configured to enable the first electronic device to create a symbology encoding the data.

15. The method of claim 12, further comprising storing the request as request data having a secured portion and an unsecured portion in the database.

16. The method of claim 15, wherein the secured portion of the request data is only accessible from the database by the computing device.

17. A system for registering a relationship between users, the system comprising:

a computing device;

a database in operable communication with the computing device; and a non-transitory processor-readable storage medium in operable communication with the computing device, wherein the processor-readable storage medium contains one or more programming instructions that, when executed, cause the computing device to:

receive a request to transfer relationship information from a first electronic device associated with a first user having associated first relationship information stored in the database, wherein the first relationship information comprises information pertaining to one or more of a physical address, a telephone number, a name, and an email address associated with the first user, create data corresponding to the request, transmit the data to the first electronic device, receive the data from a second electronic device associated with a second user having associated second relationship information stored in the database, wherein the second relationship information comprises information pertaining to one or more of a physical address, a telephone number, a name, and an email address associated with the second user, receive the first and second relationship information from the database, transmit the first relationship information to the second electronic device, and transmit the second relationship information to the first electronic device.

18. The system of claim 17, wherein the one or more programming instructions further comprise one or more programming instructions that, when executed, cause the processor to associate the first relationship information with a user account for the second user and the second relationship information with a user account for the first user.

19. The system of claim 17, wherein the data is configured to enable the first electronic device to create a symbology encoding the data.

20. The system of claim 17, wherein the one or more programming instructions further comprise one or more programming instructions that, when executed, cause the processor to store the request as request data having a secured portion and an unsecured portion in the database.

21. The system of claim 20, wherein the secured portion of the request data is only accessible from the database by the computing device.

* * * * *